United States Patent [19]
Wang

[11] Patent Number: 5,898,904
[45] Date of Patent: Apr. 27, 1999

[54] TWO-WAY WIRELESS DATA NETWORK HAVING A TRANSMITTER HAVING A RANGE GREATER THAN PORTIONS OF THE SERVICE AREAS

[75] Inventor: Weijia Wang, Sunnyvale, Calif.

[73] Assignee: General Wireless Communications, Inc., Santa Clara, Calif.

[21] Appl. No.: 08/542,860

[22] Filed: Oct. 13, 1995

[51] Int. Cl.$^6$ ..................................................... H04Q 7/20
[52] U.S. Cl. .......................................... 455/31.3; 455/422
[58] Field of Search ................................... 455/31.2, 31.3; 340/311.1, 825.44, 825.45, 825.46, 825.47, 825.48

[56] References Cited

U.S. PATENT DOCUMENTS

| | | | |
|---|---|---|---|
| 4,918,437 | 4/1990 | Jasinski | 455/31.3 |
| 5,285,496 | 2/1994 | Frank | 455/31.2 |
| 5,373,506 | 12/1994 | Tayloe | 340/825.44 |
| 5,392,452 | 2/1995 | Davis | 455/31.3 |
| 5,396,496 | 3/1995 | Ito | 340/825.44 |
| 5,535,215 | 7/1996 | Hieatt, III | 455/31.3 |
| 5,542,115 | 7/1996 | Wong | 455/31.3 |
| 5,555,446 | 9/1996 | Jasinski | 340/825.44 |
| 5,630,207 | 5/1997 | Gitlin | 340/311.1 |
| 5,638,450 | 6/1997 | Robson | 340/311.1 |
| 5,649,289 | 7/1997 | Wang | 455/31.3 |

Primary Examiner—William Cumming
Assistant Examiner—Myron K. Wyche
Attorney, Agent, or Firm—Skjerven, Morrill, MacPherson, Franklin & Friel LLP; Edward C. Kwok

[57] ABSTRACT

A two-way data network includes a broadcast control sub-network and a cellular data sub-network. The broadcast control sub-network includes a few high-power radio transmitters broadcasting into a large service area. The cellular data sub-network covers the large service area by a number of base stations each servicing a relatively small area. The wireless terminals of the two-way data network monitors the messages in a broadcast control channel at pre-assigned periodic time slots and remain in "sleep" mode at other times. A packet radio transceiver in the wireless terminal sends data to, and receives data from, the cellularized base stations. The broadcast control sub-network is used to notify the subscriber the receipt of a message. In responding to the notification, the location of the subscriber's wireless terminal is make known, thereby eliminating conventional tasks such as location and mobility management tasks and allowing wireless terminals to be low power. Communication between the cellular base stations and the wireless terminals achieves high data rate, low latency and high capacity.

68 Claims, 8 Drawing Sheets

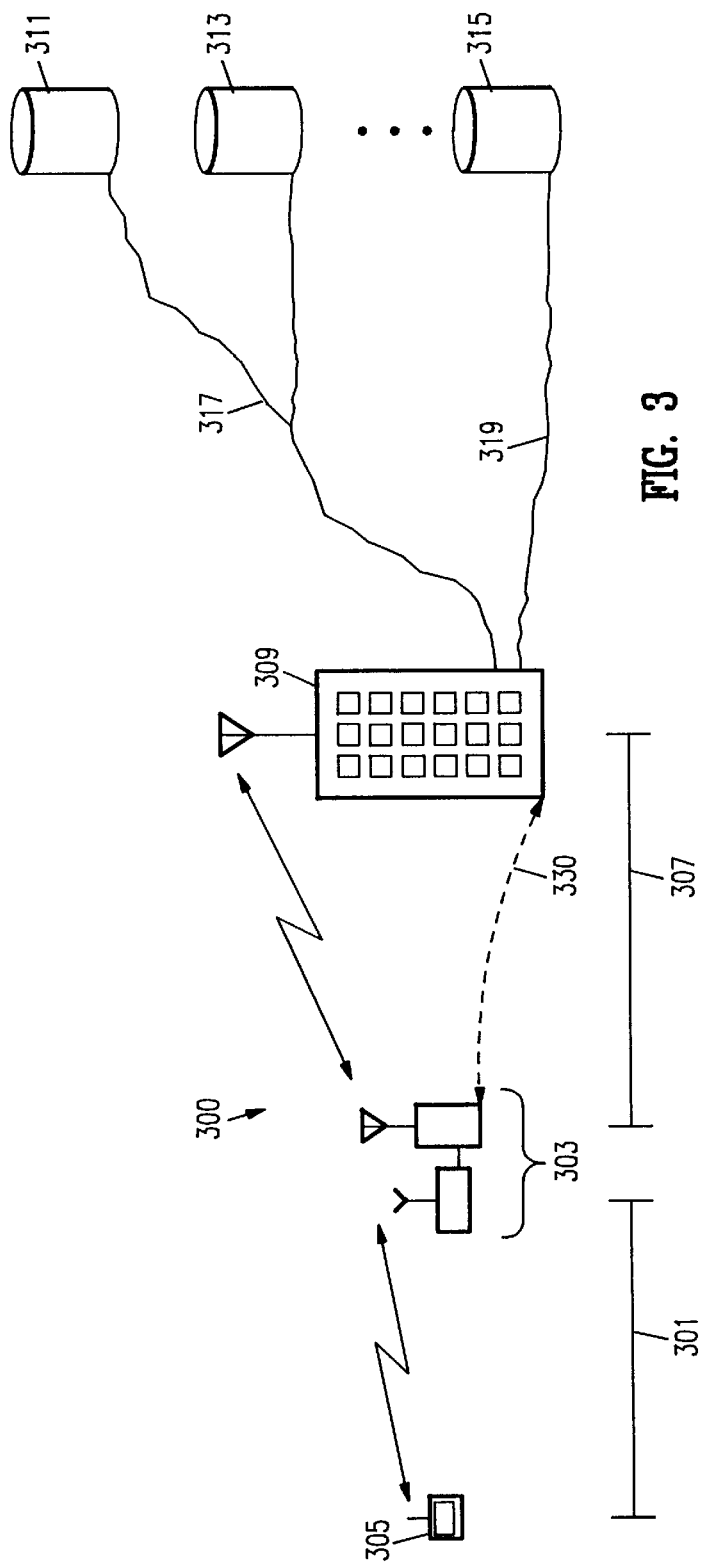
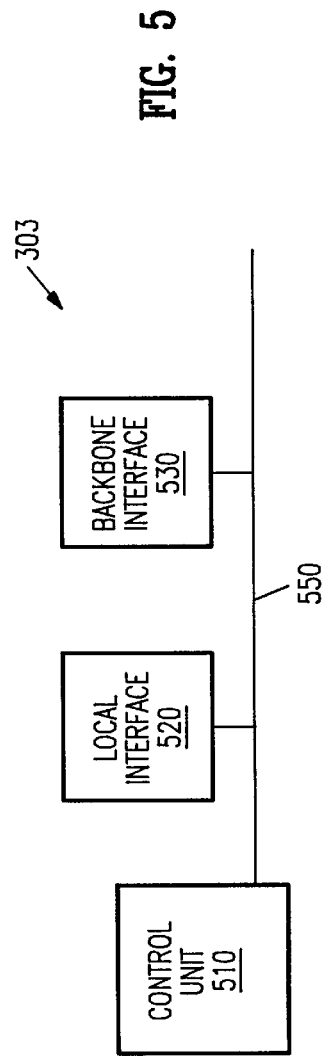
FIG. 3
FIG. 5

5,898,904

TWO-WAY WIRELESS DATA NETWORK HAVING A TRANSMITTER HAVING A RANGE GREATER THAN PORTIONS OF THE SERVICE AREAS

CROSS REFERENCE TO RELATED APPLICATIONS

The present application relates to (i) co-pending patent application, Ser. No. 08/543,101, filed on the same date as this application, entitled "Wireless Personal Mobile Terminal," by Weijia Wang et al, also assigned to General Wireless Communication Corporation, attorney docket number M-3458-US, and (ii) co-pending patent application, Ser. No. 08/542,770, filed on the same date as this application, entitled "Wireless Network Access Scheme," by Weijia Wang et al, also assigned to General Wireless Communication, attorney docket number M-3456-US. These applications are hereby incorporated by reference in their entireties to provide technological background of the present invention.

BACKGROUND OF THE INVENTION

1. Field of the Invention

This invention relates to a two-way wireless data network. More particularly, the invention relates to a two-way wireless data network, including personal mobile terminals, cellularized base stations distributed throughout a service area, and one or more network control stations.

2. Discussion of the Related Art

One-way communication systems, such as one-way paging systems, have become an increasingly important communication tool for business. Pagers are now indispensable for many people in conducting their business.

FIG. 1 shows a prior art one-way communication system 100 which is used as a one-way paging system. In a typical prior art one-way paging system, a paging party, i.e., the message sender, uses a telephone, e.g. telephone 101, to call the telephone number assigned to the paged party's pager 113. The call is received by a paging service station 103 over telephone line 102 (of course, telephone 101 could be a wireless telephone such as a cellular phone). At the prompting of paging service station 103, the paging party enters the number of his or her telephone 101. In some cases the paging party can also enter a short message at this time. Paging service station 103 converts the information received from telephone 101 into digital or analog data and transfers the data over line 105, or by wireless methods, to transmission tower 107. At transmission tower 107, a data signal 109 is generated and broadcast throughout the service area. The information that is typically included in data signal 109 is a unique identification code designating the receiving pager, and a very short message. The total size of the transmission packet is necessarily small, due to the low data rate (e.g. 2400 baud) and also because transmission tower 107 is a scarce resource shared by a large number of subscribers of the paging service over a large service area (e.g. 100 square miles). Transmission tower 107 necessarily uses high-transmission power to cover such a large service area. Further, because transmission tower 107 is shared by a large number of subscribers, not only must the messages be very short, the elapsed time between the time a message being provided to the paging network control center to the time it is transmitted can be a long delay.

When signal 109 is received by antenna 111, pager 113, which constantly monitors the broadcast channel to look for messages designated to it, alerts the paged party to the incoming signal 109 by beeping, vibrating, or some other alarm, and the telephone number of the paging party's telephone 101 (or the short message) is displayed on a display screen (not shown) of pager 113. The paged party must then respond. Responding to a paging message involves locating a second telephone 115, dialing the number displayed on pager 113, and contacting the paging party at telephone 101 over telephone line 117.

Because communication system 100 uses a single broadcast channel, and a very small number of transmitters is shared among a large number of subscribers, one-way paging network can be provided to a large number of subscribers at a user fee level which may be one-tenth the cost of cellular telephone communication. Communication protocols are also designed to allow the pager's radio receiver to "sleep" most of the time, except at pre-assigned time slots, without the risk of losing messages. Thus, a pager can typically operate on a small battery for a relatively long period of time (e.g. AAA battery operates a typical pager for a month; by comparison, a much larger battery provides several hours of use to a cellular telephone).

One-way communication networks such as the prior art one-way communication system 100 described above, are also used throughout the world for purposes other than paging. For instance, in some parts of the world, information dissemination systems, based on networks similar to one-way communication system 100, provide information such as prices of goods, stock prices, weather reports and news. Under this regime, the market, stock, weather, or news information is typically sent to service stations, similar to pager service station 103 in FIG. 1, where the information is encoded as analog or digital data. The data is then sent to broadcast station 107 where signal 109, which carries the data, is generated and broadcast. Signal 109 is then received by customers/subscribers on wireless terminals 113.

The information dissemination system based on prior art one-way communication system 100 described above is particularly useful for sending real-time information to rural or under-developed regions which are not adequately served by telephone lines and are too remote to receive standard radio or television broadcasts. Unfortunately, prior art one-way communication systems lack the ability to provide an immediate response or reply. For instance, as seen in one-way communication system 100, the paging party has no way of knowing whether the message, which is typically just the sender's phone number, was successfully transmitted or received by the paged party unless and until the paged party contacts the paging party. Further, the paged party typically cannot respond to the paging signal unless access to a hardwired or cellular telephone is available.

In addition, in a one-way communication system, the pager's lack of transmission capability severely limits its usefulness for information dissemination. For instance, because prior art one-way communication system 100 does not have an "information on demand" capability, information of potential interest to a subscriber in a broadcast region is transmitted indiscriminately to all subscribers in that region. The information is then typically repeated periodically or at regular intervals. Unfortunately, this scheme requires that each subscriber receive the same information. Typically, such indiscriminate broadcast of information results in more information than the subscriber actually wants and is inefficient. Further, because an individual subscriber does not have control over when the information is broadcast, for information having value related to its timeliness, e.g. a stock quote, the lack of "information on demand" is a severe drawback. Because of these limitations discussed above, and other limitations, one-way communication network 100 is thus limited to paging and information dissemination applications of the types discussed above.

To overcome the deficiencies of one-way paging services, two-way paging systems, are currently being developed. For example, the Motorola REFLEX system is designed to provide a reverse channel in the paging network so that pagers can acknowledge receipt of a message. FIG. 2 shows one such two-way paging system 200. Two-way paging system 200 includes: pagers 213 and 230, with antennas 211 and 231, respectively; transmission tower 207; and receiving stations 215–219.

Pager 213 includes a transmitter (not shown) so that when pager 213 receives signal 209 from transmission tower 207 (which, in this example, was initiated by a telephone call to a paging station, and leaving pager 230's identification code as the reply destination), the subscriber operating pager 213 respond to the message by transmitting a signal 220 to one of the receiving stations 215–219. It is worth noting that receiving stations 215–219 are listen-only stations and are not capable of transmitting messages back to a pager.

When one or more of receiving stations 215–219 receives signal 220 from pager 213, the receiving station or stations relay the data encoded in signal 220 to transmission tower 207 by line 222. Transmission tower 207 then broadcasts a signal 223 to the party operating pager 230.

By adding receiving stations 215–219, two-way paging system 200 solves one of the problems associated with one-way communication networks, i.e., subscriber operating pagers 213 or 230 can acknowledge receipt of a message immediately, without resorting to another communication medium such as the telephone. However, as pointed out above, data link 220 between pager 213 and receiving unit 215 is a one-way data link. Therefore, receiving station 215 cannot send any information back to pager 213. Consequently, a subscriber operating pager 213 still cannot determine whether his acknowledgement or reply signal 220 has been successfully received and forwarded by receiving station 215, until an acknowledgement message is sent via transmission tower 207. Because transmission tower 207 handles all broadcast traffic to the pagers, the acknowledgement message may be delayed for a long time. Consequently, two-way paging system 200 cannot be used for applications that require reliable data delivery confirmation. Further, because transmission of a data message depends on transmission tower 207, the bandwidth of transmission tower 207 is still limited in the same manner one-way communication network 100 discussed above. Thus, other than providing an acknowledgement capability to the pager, two-way paging system 200 suffers substantially all the disadvantages of one-way communication network 100.

In addition to the technical shortcomings of two-way paging system 200, two-way paging system 200 is also not economical. One major drawback of two-way paging system 200 is it's failure to make use of the existing one-way paging infrastructure. Instead, two-way paging system 200 operates in parallel with, and in competition with, existing one-way communication systems because two-way paging system 200 uses a different operating frequency from conventional one-way paging services which, in turn, requires separate transmission towers, signal protocols, data rates, and data formats which are incompatible with those used with one-way communication system 100. Consequently, in order for pagers 213 and 230 to communicate under two-way paging system 200, all subscribers operating wireless terminals must subscribe to the same paging service and nothing is offered to allow subscribers of two-way paging system 200 to communicate with other two-way or one-way paging services.

Since two-way paging system 200 does not utilize the existing one-way communication infrastructure, two-way paging systems, such as two-way paging system 200, have been slow to gain acceptance in the marketplace due to the large number of one-way paging systems already in use throughout the world which provide economical service and represent huge capital investments. The marginal additional capability of two-way paging system 200 does not justify the sizable additional investment necessary for such an entirely new and incompatible system. Besides, even if such an investment is made, building a new subscriber base for this system is likely to be difficult, since a minimum number or "critical mass" of customers is required before the network becomes viable. The new subscriber in prior art two-way paging system 200 faces not only the costs of both purchasing a new pager and accepting a new pager number, but also the severe constraint that two-way communications are possible only with other subscribers of the same paging service.

Two-way communication services which provides two-way communication between a cellularized receiving or base station and a mobile unit exist. For example, in a cellular digital packet data (CDPD) system, a large number of cellularized base stations are distributed all over the service area. Cellularizing the service area offers two advantages: (i) allow mobile units and base stations to transmit at higher data rate with relatively low power, since the expected distance between a mobile unit and a base station in the vicinity is short; and (ii) larger capacity is provided because base stations which are separated by large enough distances can use the same radio channels. Such a system provides thus very high capacity, low response delay and allows the mobile units to transmit at relatively high data rates. In such a system, two-way symmetrical and reliable data links can also be provided. However, such a system is expensive and complex.

In a CDPD system, because connectivity is maintained over the entire duration of a data communication session, multiple channels must be provided to allow multiple sessions to be maintained simultaneously. To locate a recipient mobile unit of a message, the network broadcasts the address of the recipient mobile unit from all the base stations in the service area until the recipient unit responds. Thus, a large amount of network resources is dedicated to locating mobile units. Further, to maintain continuous connectivity and to allow real time performance, when the session is established, the CDPD unit is associated with a base station with which it communicates. In addition, because a mobile unit can be expected to be used in a moving vehicle, it is possible that the mobile unit moves out of the service range of the initially associated base station and moves into the service range or ranges of one or more such base stations during the duration of a session. Thus, provisions must be made to disengage an associated base station and to engage an additional base station or stations ("hand off") during the course of the session. The control mechanisms for maintaining a CDPD session, including tasks typically termed "connectivity management" and "mobility management", involve sophisticated algorithms which require high performance computers to handle setting up the session, maintaining the session, and tracking the communicating mobile units as they move between service areas of the cellularized base stations. The complexity of the system requires a large investment in expensive equipment. Often, these control mechanisms are centralized, i.e. a large network switching or control center is provided to handle the mobile units in a given service area, so that, at times of heavy data traffic, the network control center may become a bottle neck, introducing undesirable latency into the system.

Another major disadvantage of the CDPD system is the requirement that the receiver of the mobile unit must be on at all times to receive messages. As a result, such a mobile unit requires a battery that is, at the present time, too undesirably bulky for mobile use. It would also be extremely difficult for power-saving features to be provided in such a mobile unit. Unlike a pager, which monitors only one paging channel, the mobile unit of a CDPD system must monitor a different radio channel when it is located in a different cell. Further, control information (e.g. timing information and recipient addresses) are broadcast by base stations in dedicated control channels. While a pager can be assigned a periodically occurring time-slot during which it "wakes" up to check for messages, a similar scheme in a mobile unit of a CDPD system would require timing in all the cellular base stations to be synchronized. Failure to synchronize all base station can lead to a mobile unit checking for the broadcast of its address during the wrong time slot.

Thus, what is needed is a method for establishing a two-way data network which (i) is high system capacity; (ii) has a low equipment cost resulting from a simple design, (iii) has a communication protocol which allows low-power operation by the wireless terminals; (iv) utilizes the existing one-way communication network infrastructure, (v) is compatible with existing one-way pagers; (vi) provides secure and reliable data transfer with short response time; and (vii) which allows bidirectional communication between mobile units without requiring sophisticated equipment to perform location, connectivity and mobility management tasks.

SUMMARY OF THE INVENTION

According to the invention, a wireless data network includes two sub-networks: (i) a simple broadcast network, e.g. a one-way paging network, to broadcast over a broadcast channel control messages to the entire service area of the wireless data network, and (ii) a cellular two-way communication network in which base stations in "cells", each serving only a small portion of the broadcast network's service area, are provided for data communication. Such a wireless data network includes wireless terminals which, in one embodiment of the invention, are each a simple radio transceiver, with a user interface that includes a simple display and a keyboard. The base stations use a novel access protocol which allows all the base stations to communicate with the wireless terminals over the same packet radio link at the same carrier frequency. When not engaged in two-way data communication, these wireless terminals monitor only the broadcast channel for the control messages. Thus, in a wireless terminal, the remainder of the circuits, other than the receiver for the broadcast channel, can be placed in a sleep mode until data communication begins. Thus, power efficient operations using a small battery power source can be provided.

The wireless two-way data network according to the invention also includes one or more cellularized base stations which, in one embodiment of the invention include two radio transceivers. A first base station radio transceiver is used as part of a local radio link between a wireless terminal and the base station. The second base station radio transceiver is provided for a radio link, possibly higher power, between the cellularized base station and a network control center, which is part of a back-haul data network.

According to the method of the invention, network control centers are provided to process and route all data traffic from the various base stations. The network control centers are connected to various applications such as information data bases, paging services, or credit verification services, through existing networks such as a packet switch network or a public telephone network using modems.

According to one embodiment of the invention, the network control centers are connected to existing one-way pager transmission towers where signals can be transmitted using the existing one-way pager infrastructure.

Thus, the present invention provides two-way communication capability by leveraging the existing infrastructure of one-way paging. For example, expensive resources such as high-power paging transmitters can be used for both one-way and two-way applications. Further, the wireless terminals and the cellularized base stations form a relatively inexpensive data network. An existing one-way paging user can be converted to become a user of this wireless data network of the present invention by simply purchasing such a wireless terminal. This data network provides additional applications beyond mere two-way paging.

Because the wireless terminal transmits messages only to the cellularized base stations within a very limited range of its immediate vicinity, the data rate could be made relatively high. Because the two-way link between the wireless terminal and a cellularized base station is local, i.e. the limited range of the base station, the same frequency can be used simultaneously at different locations of the data network without collisions. Thus, this system is very spectrum efficient and has a high data capacity, since the bandwidth is dramatically increased by the simultaneous use of the same communication frequency locally in various locations of the data network.

Because of the simplicity of the system, the present invention can provide the wireless data network to users at low service fees. The low-power requirement of a typical personal wireless terminal used in the present invention allows it to have a small form factor and long battery life. Two-way communication capability makes available many types of communication and information services to a large number of users. The use of a relatively simple network access scheme, with all mobile unit-base station communication using the same frequency channel, allows the network to be implemented very inexpensively, and without requiring high performance computers to perform location, connectivity and mobility management tasks. Because an acknowledgement packet is provided to the mobile terminal when the first base station successfully receives a data packet, the present invention is highly reliable with a short expected response time.

In summary, the present invention provides a wireless data network that has both the advantages of one-way and two-way communication networks without the high costs associated with two-way communication networks, such as the CDPD system discussed above.

The present invention is better understood upon consideration of the detailed description below and the accompanying drawings.

BRIEF DESCRIPTION OF THE DRAWINGS

FIG. 3 shows a generic prior art architecture of a two-way wireless data network in accordance with the invention.

FIG. 5 is a block diagram of a base station in accordance with one embodiment of the invention.

Like objects are designated the same reference symbols in the different Figures.

DETAILED DESCRIPTION OF THE INVENTION

Figure 1:
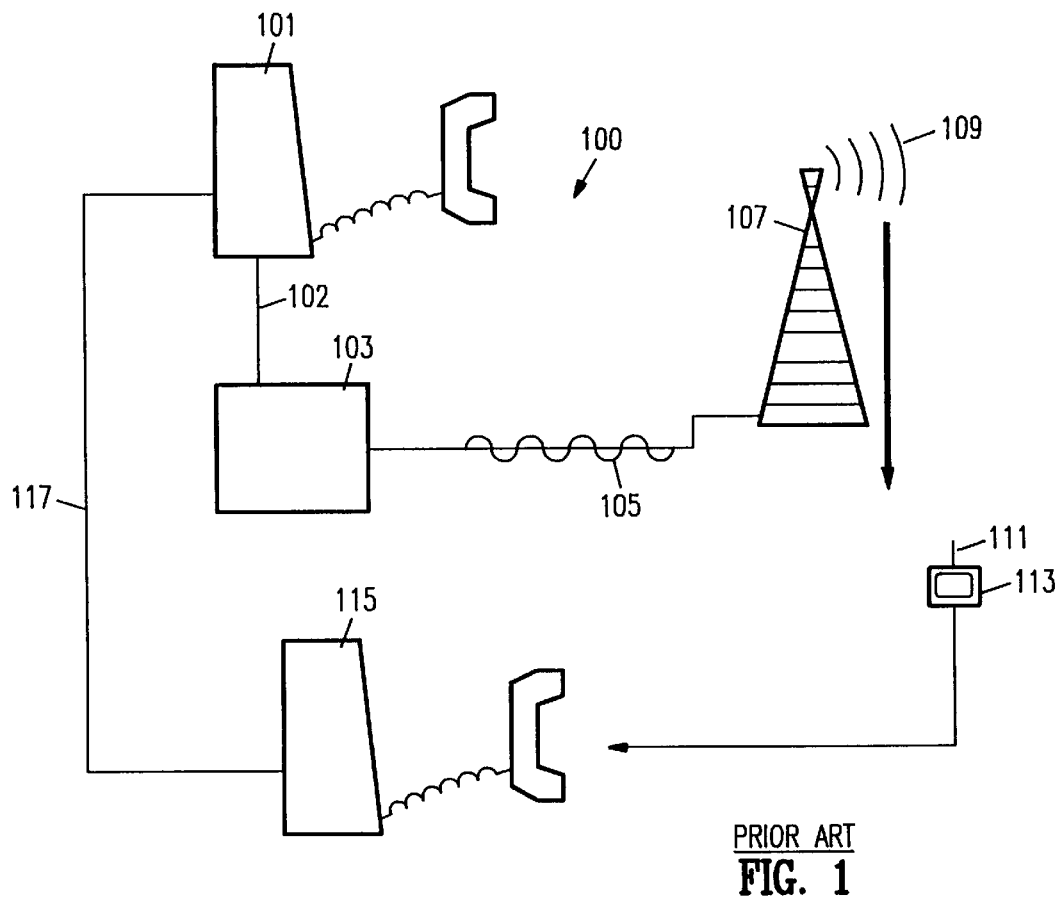
FIG. 1 shows a prior art one-way communication system which is used as a one-way paging system.

FIG. 3 shows an architecture of a two-way wireless data network 300, in accordance with the invention. Two-way wireless data network 300 includes (a) wireless terminal 305; (b) cellularized base station 303; (c) network control center 309; (d) interfaces 311–315 to information and communication applications; and (e) radio links 301 and 307.

According to the method of the invention, base station 303 is capable of two-way communication with both wireless terminal 305 and network control center 309. Consequently, wireless terminal 305 can send a message to base station 303 and receive an acknowledgement from base station 303 over radio link 301. Base station 303 can then send the message from wireless terminal 303 to network control center 309. Upon receiving the message from base station 303, network control center 309 can send the message to the intended recipient using the infrastructure of a conventional one-way paging network. If desired, network control center 309 can also broadcast an acknowledgement signal to confirm to wireless terminal 305 receipt of the message by network control center 309.

Network control center 309 is in turn connected by various interfaces 311–315 to information and communication applications, which include: (a) existing one-way communications networks; (b) information dissemination networks or data banks; (c) security or utility monitoring systems; (d) electronic map or positioning systems; or (e) any one of numerous other possible applications.

Wireless terminal 305 is typically a hand-held or mobile terminal unit with a keyboard for data and command input and a display for displaying control and data information. One application of wireless terminal 305 is as a wireless terminal or as a receiving terminal for facsimile transmissions. One such wireless terminal suitable for implementing wireless terminal 305 is provided in co-pending patent application, entitled "Wireless Personal Mobile Terminal", Ser. No. 08/543,101, which is incorporated by reference above.

Figure 4:
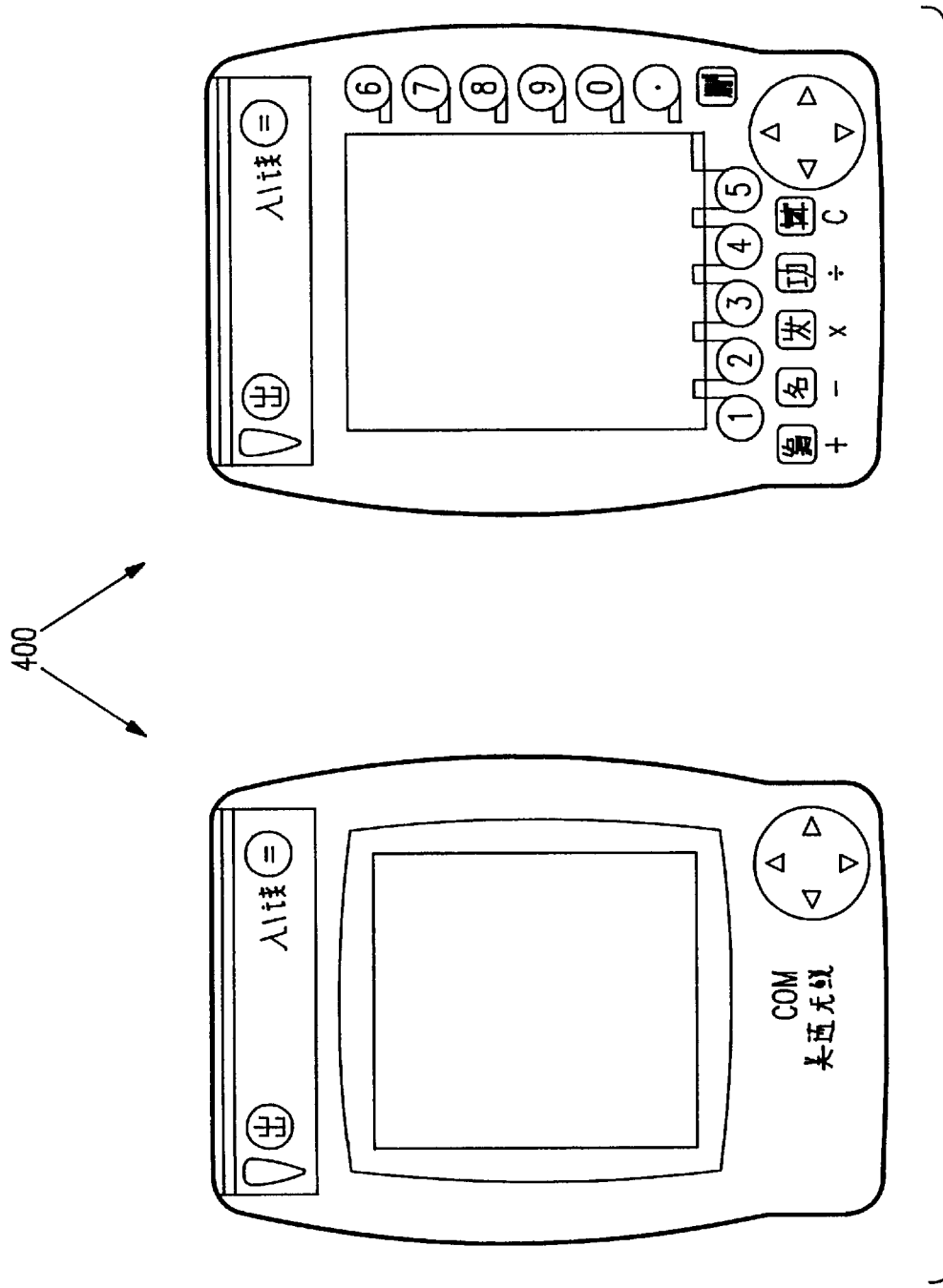
FIG. 4 shows one embodiment of a wireless terminal which can be used with the invention.

FIG. 4 shows the general appearance of one embodiment of a wireless terminal 400 capable of being used with two-way communication network 300 as wireless terminal 305.

Figure 2:
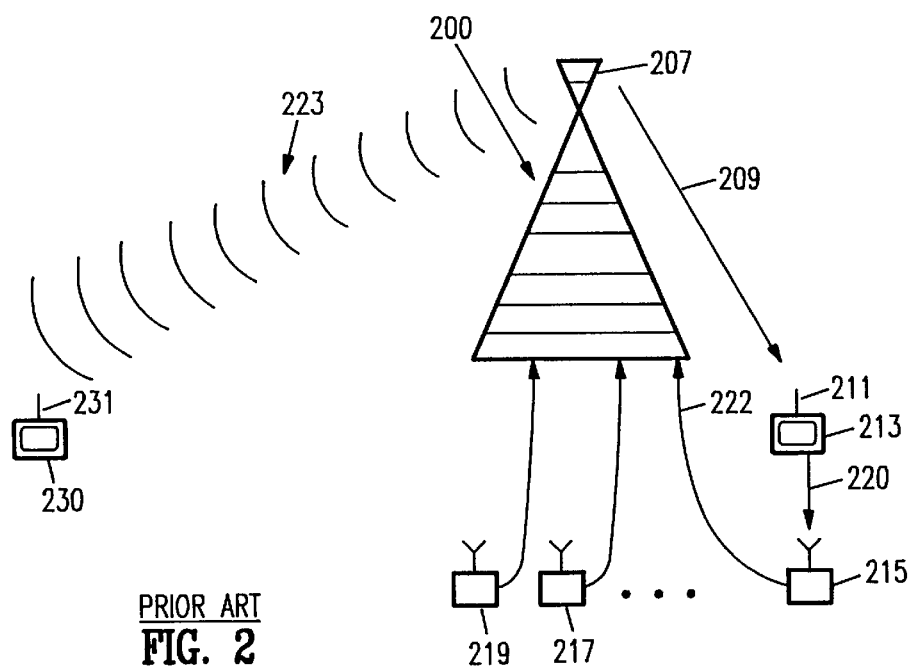
FIG. 2 shows a typical two-way paging network.

Referring back to FIG. 3, radio links between a base station and a wireless terminal unit, such as radio link 301, are typically low-power local packet radio links. In this embodiment of the invention, local radio link 301 can operate with a power of 100 milli-watts to provide an expected service range of approximately 1 km. As described in more detail below, unlike radio link 220 of two-way communication system 200 (see FIG. 2), local radio link 301 (see FIG. 3) is a two-way radio link which allows bidirectional message flow between wireless terminal 305 and base station 303.

A single base station 303 and wireless terminal 305 are shown in FIG. 3. However, base station 303 and wireless terminal 305 are only representative of numerous base stations and wireless terminals which can be part of two-way wireless data network 300. In particular, heavily populated areas served by two-way wireless data network 300 will require thousands of wireless terminals 305, hundreds of base stations 303, and several network control centers 309. Indeed, one advantage of the method of the present invention is that the size of two-way wireless data network 300 is scalable to the operating environment, i.e., as more and more customers utilize two-way wireless data network 300, more base stations 303 and network control centers 309 can be added to accommodate the new traffic.

Figure 10:
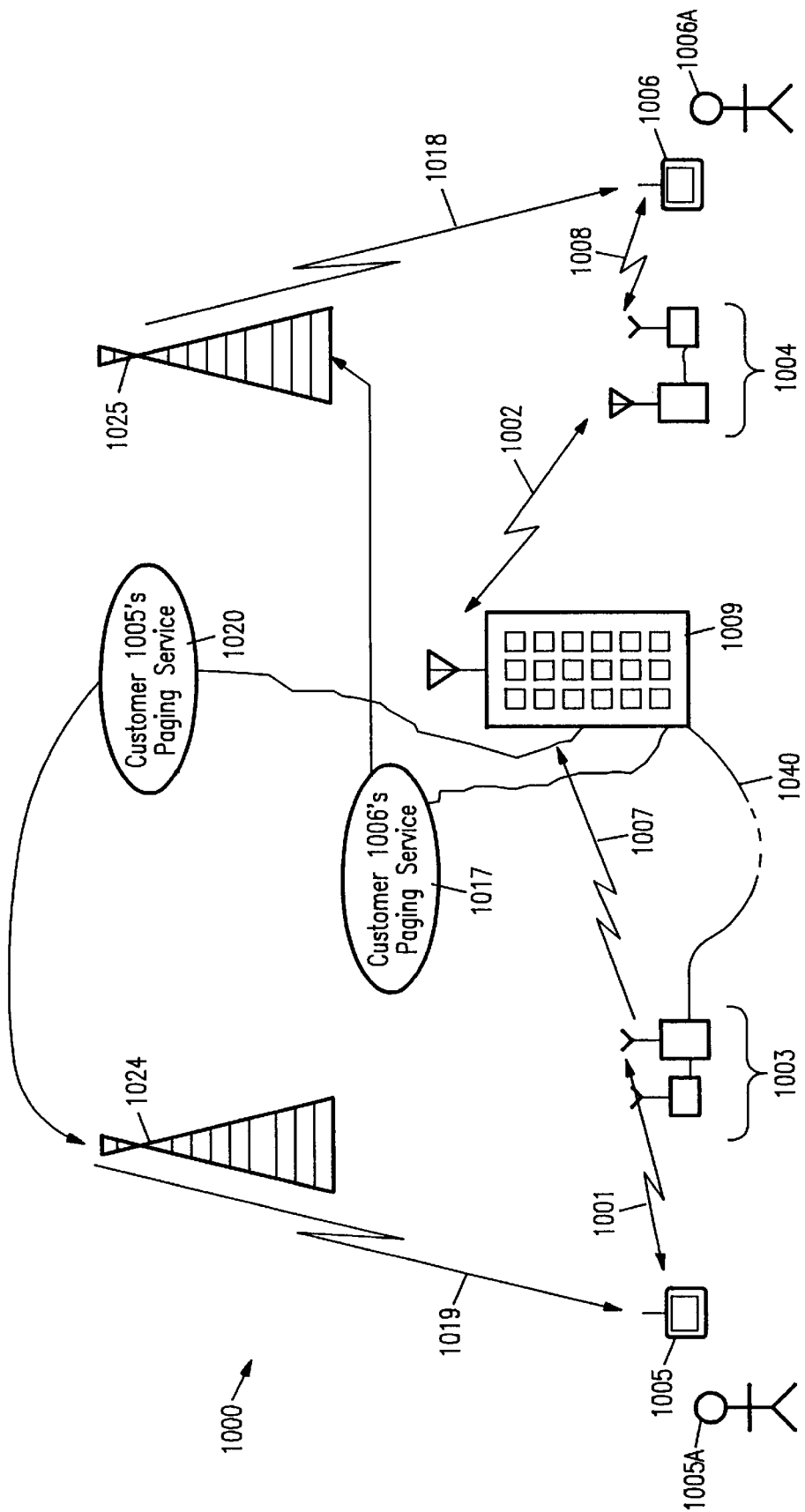
FIG. 10 shows one example of a two-way paging system in accordance with the invention.

FIG. 10 shows one example of a two-way data network 1000, used as a two-way paging system, according to the present invention. As shown in FIG. 10, two-way paging system 1000 includes (i) wireless terminals 1005 and 1006, which can each be a personal mobile terminal, such as that described in the co-pending patent application, entitled "Wireless Personal Mobile Terminal," by Weijia Wang et al, which is incorporated by reference above; (ii) base stations 1003 and 1004; (iii) network control center 1009; and (iv) high power transmitters 1021 and 1025, which can be part of one or more existing one-way paging systems.

Wireless terminals 1005 and 1006 are operated by subscribers designated by reference numerals 1005A and 1006A, respectively. When subscriber 1005A wishes to send a message to subscriber 1006A, subscriber 1005A enters subscriber 1006A's identification and a message into pager 1005 using the alpha-numeric keys on pager 1005, and initiates sending the message to a nearby base stations 1003. Unlike messages in one-way communication networks, where return routing is not provided, this message also contains a paging identification code identifying the sender, which is personal mobile terminal 1005.

In the example shown in FIG. 10, the message from pager 1005 is received by base station 1003 via local radio link 1001. As with local radio link 301 described above (see FIG. 3), radio link 1001 is a two-way radio link which allows pager 1005 to both transmit messages to, and receive messages from, base station 1003. In response, base station 1003 transmits an "acknowledgement" message on radio link 1001 to inform subscriber 1005A that his transmission was successful. Therefore, unlike two-way paging system 200 described above, two-way paging network 1000 allows for secure transmissions with reliable transmission confirmation.

Base station 1003 transmits the message received from pager 1005 to network control center 1009 via radio link 1007. Base stations 1003 and 1004 are similar to base station 303 (see FIG. 3), whose construction and operation are discussed in more detail below. Radio link 1007 is also a two-way radio link, so that messages are exchanged between base station 1003 and network control center 1009. Link 1007 need not be accomplished by wireless communication. In fact, where a telephone network is accessible, a wire communication link is possible. Such wire communication is indicated in FIG. 10 as telephone line 1040.

At network control center 1009, the message from base station 1003 (and pager 1005) is processed for authorization and billing purposes based on its service agreement with subscriber 1005A. When such administrative tasks are completed, network control center 1009 sends a message to subscriber 1006A's paging service 1017, notifying subscriber 1006A that he has a message from subscriber 1005A at the network control center 1009. This notification message from switching center 1009 to subscriber 1006A can be accomplished in the same manner as the way messages are sent in a one-way paging system. Thus, when the message is received by paging service 1017, the message is sent to transmitter 1025 (which is operated by subscriber 1006A's paging service 1017) and transmitted to pager 1006. Upon receiving this notification message, subscriber 1006A sends a message to network control center 1009 over the two-way radio links 1008 and 1002 requesting that the message from subscriber 1005A be forwarded. Because the identification of the base station 1004 is included in this message from subscriber 1006A, network control center 1009 can directly deliver subscriber 1005A's message to subscriber 1006A via the single base station 1004. In essence, subscriber 1006A is located because of his response to the one-way paging message (i.e. the message notifying subscriber 1006A of subscriber 1005A's message) sent by network control center 1009A through the one-way paging service. Thus, under this scheme, two-way paging service between subscribers 1005A and 1006A is accomplished without a complicated algorithm to locate the participants, as is practiced in cellular phone communication. The one-way paging network which broadcasts the notification message also performs the control function of locating subscriber 1006. (Contrast, for example, the complexity and cost of such well-known scheme as CDPD—cellular digital packet data). This system can therefore be implemented simply to derive tremendous savings.

Unlike systems in the prior art, in accordance with the present invention, subscriber 1006A can send an immediate reply using subscriber 1005A's paging identification in the message received. The reply message can be composed in the same manner discussed above with respect to subscriber 1005A's message, or it can be simply an automatically generated acknowledgement message dispatched by a special command to the user interface. The reply message or acknowledgement signal is then transmitted from pager 1006 to a second base station 1004 via two-way radio link 1008. The reply message finds it way to subscriber 1005A in substantially the same way subscriber 1005A's message reaches subscriber 1006A. In this instance, the message is sent through base station 1004, network control center 1009, paging service 1020, and transmitter 1021. In this example, paging services 1017 and 1020 can be operated by the same company or they can be entirely separate, and even competing, paging services. The present invention thus provides two-way paging service building on top of the existing infrastructure of one or more one-way paging networks.

Two-way paging system 1000 has several important technical advantages over two-way paging system 200 described above. First, while radio link 220 between pager 213 and receiving station 215 of two-way paging system 200 (see FIG. 2) is a one-way radio link, radio links 1001, 1007, 1008, and 1002 are two-way reliable radio links, so that base stations 1003 and 1004 can confirm that messages transmitted from pagers 1005 and 1006 are successfully received and forwarded. As a consequence, two-way paging system 1000 can be used for applications that require reliable data delivery conformation.

Two-way paging system 1000 also has several important economic advantages over two-way paging system 200. First, as discussed above and shown in FIG. 10, two-way paging network 1000 utilizes the infrastructure of existing one-way paging services 1017 and 1020. For example, high power transmitters 1021 and 1025 are used for routing messages to the intended recipients. In addition, the operating frequencies of the existing one-way pager services are utilized for links 1019 and 1018 of two-way paging network 1000. There is therefore no need for an existing service provider to license additional radio frequencies to provide two-way communication under the present invention, and a current one-way paging network subscriber can continue to receive one-way paging messages.

Further, because two-way paging network 1000 leverages the existing one-way paging network infrastructure, operators of one-way paging services, such as paging services 1017 and 1020 of FIG. 10, can provide their subscribers the two-way paging service of the present invention with minimal capital investment. The local base stations, such as base station 1003 and 1004 can be provided by a third company contracting with the operators of paging services 1017 and 1020. Consequently, an instant massive distribution channel is created because virtually any one-way paging service 1017 or 1020 can provide two-way paging service to their existing subscribers at the cost of a wireless terminal, such as that described in the co-pending application, entitled "Wireless Personal Mobile Terminal", incorporated by reference above. Further, under the system of the present invention, both users of one-way paging and users of two-way paging can be served by the same system.

Further, because of the two-way radio links (e.g. radio links 1007 and 1002) between base stations 1003 and 1004 and network control center 1009, the number of leased telephone lines needed to operate the system is significantly diminished compared to two-way paging system 200. Savings in leased telephone lines can be an important advantage because up to three-fourths of the ongoing overhead for existing paging services go to leasing telephone lines. Also, since two-way paging network 1000 uses existing transmission towers 1021 and 1025, the cost of implementing the network is significantly reduced, thereby presenting minimal risk to the paging service company, while, at the same time, allowing the wireless terminal subscriber to enjoy the same wide coverage as one-way pager subscribers. Frequency reuse can also be employed in two-way paging network 1000 to increase channel utilization.

Further, like two-way wireless data network 300, two-way paging network 1000 is scalable to the size of service area and the number of subscribers. Thus, the capital investment is made incremental as the subscriber base grows. For example, base stations 1003 and 1004 can be added as the subscriber base grows.

FIG. 5 is a block diagram of base station 303 in accordance with one embodiment of the invention. Base station 303 includes a control unit 510, a local radio interface 520, local bus 550, and a backhaul interface 530. Local interface 520 includes a radio transceiver for two-way communications with wireless terminals, such as wireless terminal 305, and other base stations, such as base station 303. When wireless terminal 305 is within a local broadcast area of base station 303, a local radio link, such as radio link 301, can be created between wireless terminal 305 and local interface 520. The network access scheme used in radio link 301 is described in more detail below and in the above-mentioned co-pending patent application, Ser. No. 08/543,101, filed on the same date as this application, entitled "Wireless Network Access Scheme," by Weijia Wang et al, also assigned to General Wireless Communication, attorney docket number M-3456-US. In this network access scheme, reliable data links in which receivers, base stations and mobile units alike, send acknowledgement packets in response to successful receipt of a message, and transmitters, base stations and mobile units alike, retransmit when an expected acknowledgement packet does not arrive after a predetermined time period. The network access scheme also includes a multiple access protocol as a channel access protocol. The local broadcast area for base station 303 is limited primarily by the transmission power of wireless terminals 305, the efficiency of the antenna used by base station 303, and obstacles which attenuate radio signals in the local broadcast area such as mountains and buildings. The transmission power of the transceiver in local interface 520 (see FIG. 5) has a lesser effect in determining the local broadcast area. Typically, in an urban area, transmission power attenuate in accordance with the third or the fourth power of distance. Accordingly, in one embodiment of the invention, the transceiver in local interface 520 is a low power transceiver which is similar in construction and power to transceivers within wireless terminal 305 (see FIG. 3). Typically, base station 303 is provided slightly greater transmission power than wireless terminal 305 because base station 303 is provided with an antenna that can receive lower power signals than can the antennas used by wireless terminal 305. The transmission power of base station 303 can also be increased to facilitate communications between base stations.

Backhaul interface 530 (FIG. 5) communicates with network control center 309 over link 307. Backhaul interface 530 couples to a network which is based on either wired or wireless communication, or both. For example, in one embodiment of the invention backhaul interface 530 includes a modem interface for base station 303 to communicate with network control center 309 via a public telephone switching network (PTSN) (see FIG. 3). Alternatively, backhaul interface 530 may include a multi-access radio transceiver with a 10 to 20 km range, a wireless local area network (LAN), a wired X.25 PAD (Packet assembler and dissembler network), or a cellular phone modem for creating a cellular communication link between base station 303 and network control center 309 (see FIG. 3).

Control unit 510 (see FIG. 5) implements a first protocol for communications with a wireless terminal 305 (see FIG. 3) in the local broadcast area, a second protocol for communications with network control center 309, and an interface between local interface 520 and backhaul interface 530 (see FIG. 5). In one embodiment of the invention, control unit 510 can be provided by a "personal computer" and associated resources such as volatile and non-volatile memory. Non-volatile memory, such as a ROM, EPROM, EEPROM, Flash memory, or a hard disk, are provided to store software which controls local interface 520 and backhaul interface 530 and implements the necessary protocols and interface. Suitable personal computers for implementing base station 303 include widely available "mother boards" from a variety of sources, such as a 386SX mother board, based on the Intel 386SX compatible microprocessors. An advantage of using such a mother board is the simplification of the programming task for implementing the protocols and interfaces, since tools for programming such mother boards are widely available.

Backhaul interface 530 and local interface 520 connect to control unit 510 via a standard local bus 550, such as an ISA bus, an EISA bus, a PC-104 bus, a VESA bus, or a PCI bus. ISA/EISA buses are currently popular and provide low cost interfaces. An advantage of using a standard local bus is that local and backhaul interfaces can be easily upgraded or changed in a modular fashion. For example, in one embodiment of the invention, local interface 520 includes two separate printed circuit boards (not shown) which are attached to local bus 550. The printed circuit boards each include a radio transceiver tuned to operate at different channels to provide addition bandwidth, or to provide redundancy in case of a failure of one of the printed circuit boards.

Figure 6A:
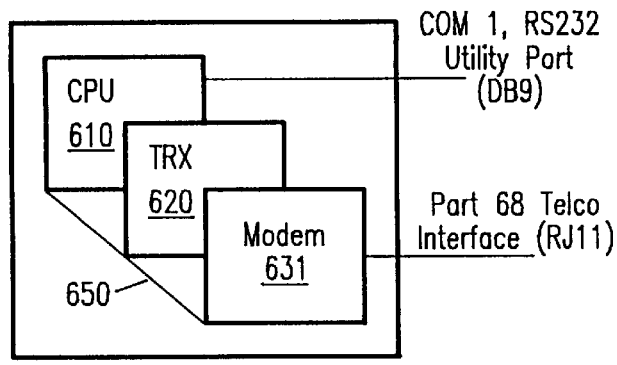
FIGS. 6A, 6B, 6C, and 6D are block diagrams of alternative base station configurations in accordance with other embodiments of the invention.
Figure 6B:
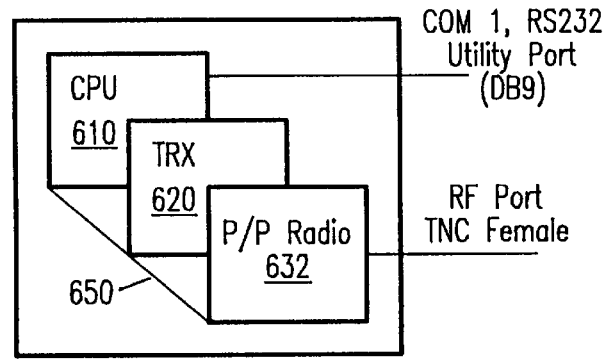

Alternatively, in base stations 303, the circuits in the backhaul interface 530 and the local interface 520 can connect to control unit 510 via standard PC I/O ports such as a serial (RS232) port or a parallel port. FIGS. 6A to 6D show example configurations for base stations 303 (see FIG. 3). In the embodiments of FIGS. 6A and 6B, a central processing unit (CPU) 610 connects transceiver 620 and a modem 631 (FIG. 6A) or radio transceiver 632 (FIG. 6B). In these embodiments, CPU 610 performs the functions of control unit 510, transceiver 620 performs the functions of local interface, and modem 631 (FIG. 6A) or radio transceiver 632 (FIG. 6B) serves as backhaul interface 530. Modem 631 can connect to a standard PSTN via a standard RJ11 connector and provides a digital channel to network control center 309 (see FIG. 3). Radio transceiver 632 (see FIG. 6B) has a connection for an antenna and provides a wireless digital channel to network control center 309 (see FIG. 3).

Figure 6C:
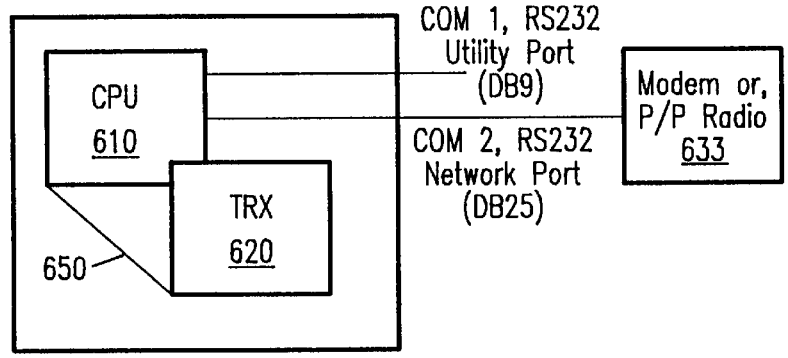
Figure 6D:
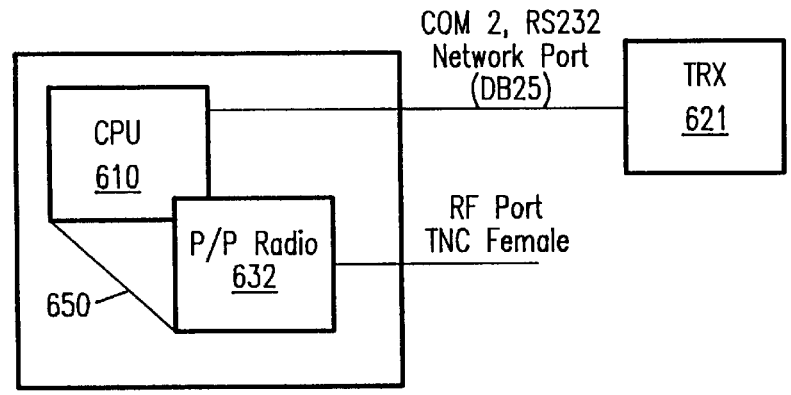

Similarly, in the embodiment of FIG. 6C, CPU 610 connects to transceiver 620 via local bus 650 and connects to a modem or radio transceiver 633 in the backhaul interface via an RS232 port on CPU 610. In FIG. 6D, CPU 610 connects to transceiver 632 in the backhaul interface via local bus 650 and connects to a transceiver 621 in the local interface via the RS232 port on CPU 610. Other configurations of base station 303 (see FIG. 3) provide multiple channels for communications with wireless terminals 305 in the local area of base station 303.

Figure 7B:
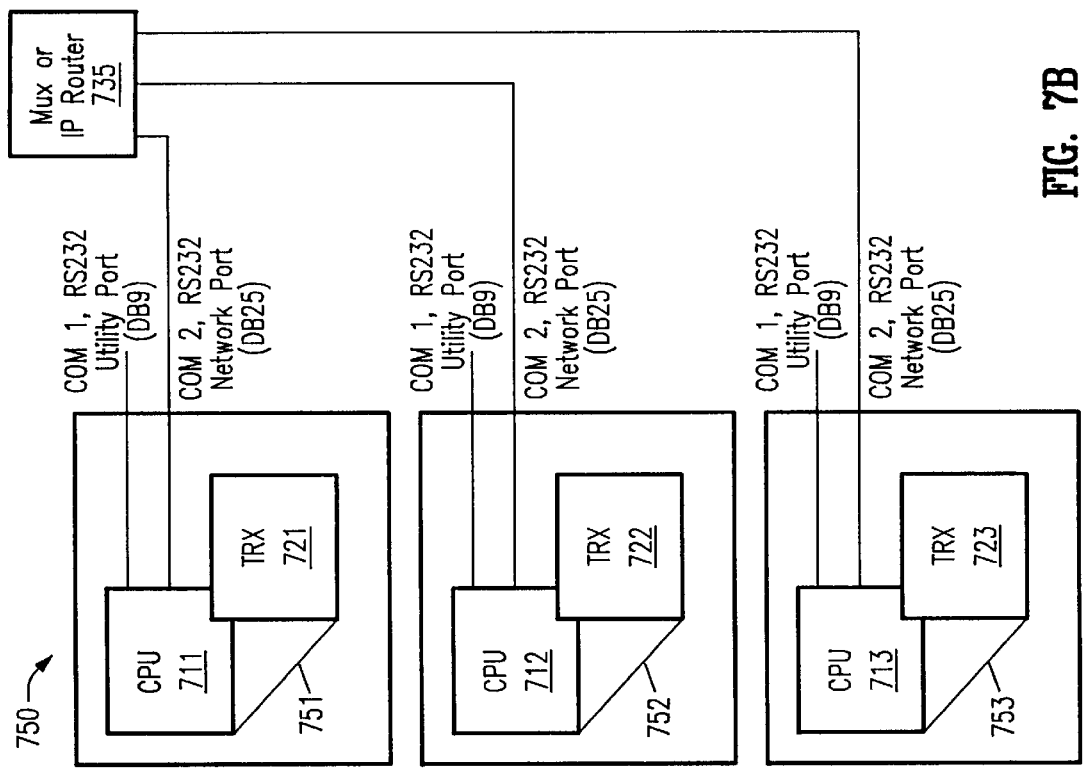
FIGS. 7A and 7B are block diagrams of two multi-channel base stations in accordance with an embodiment of the invention.
Figure 7A:
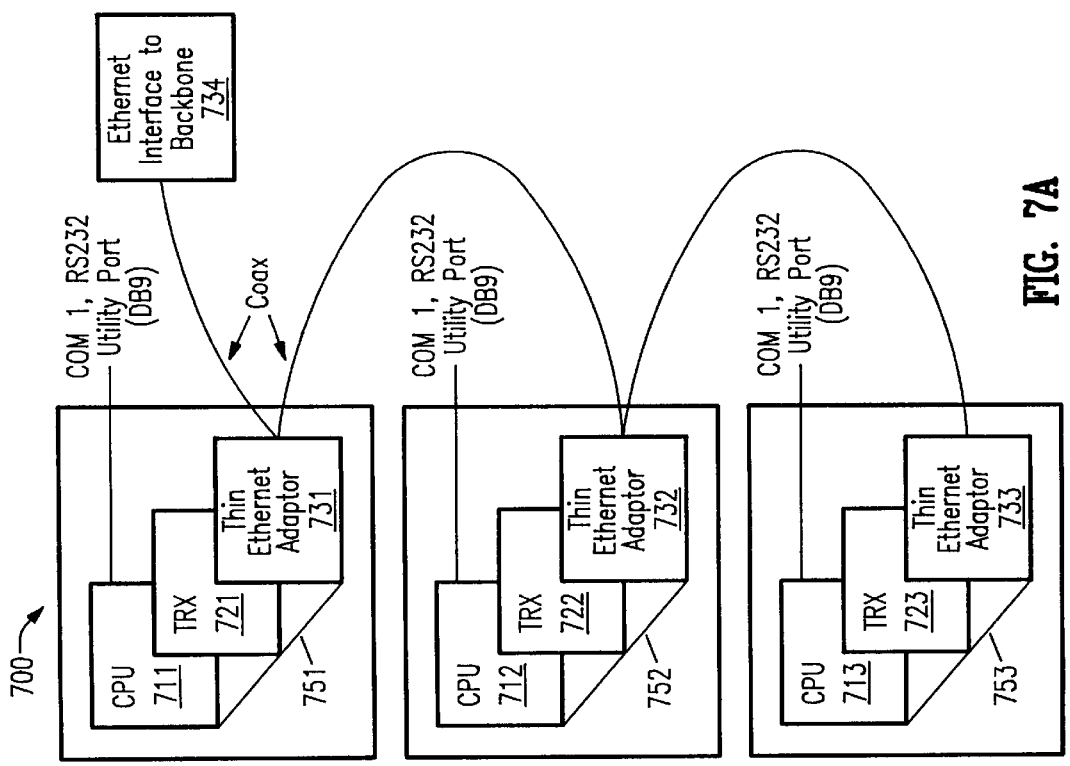

In FIG. 5, control unit 510 is shown to control a local interface which can include transceivers for two or more wireless channels. Alternatively, base station 303 (see FIG. 3) can have a separate control unit for each local channel. FIGS. 7A and 7B are block diagrams of multi-channel base stations. FIG. 7A shows a base station 700 that includes three CPUs 711–713 connected via respective local buses 751 to 753 to respective transceivers 721 to 723. Transceivers 721 to 723 communicate with wireless terminals, such as wireless terminal 305 (see FIG. 3), each using a different frequency. Otherwise, transceivers 721 to 723 (see FIG. 7A) need not be constructed identically or transmitting at the same power output level. CPUs 711 to 713 also connect, via respective local buses 751 to 753, to ethernet adapter 731 to 733, respectively. Ethernet adapters 731 to 733 couples each channel of base station 700 to a local area network (LAN), which is connected to a larger backhaul network via ethernet-to-backhaul interface circuit 734.

FIG. 7B shows a base station 750 that also includes three CPUs 711 to 713 connected via local buses 751 to 753 to transceivers 721 to 723, respectively. Base station 750 differs from base station 700 in that base station 750 uses a router or multiplexer 735 to select which of CPUs 711 to 713 has access to a communication link to network control center 309. Additionally, multiplexer 735 connects to RS232 I/O ports of CPUs 711 to 713 rather than to local busses 751 to 753.

Figure 8A:
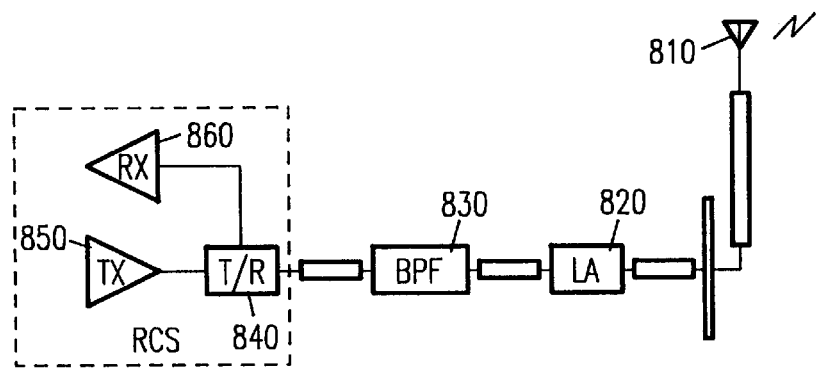
FIGS. 8A, 8B, and 8C are block diagrams of antenna systems for transceivers in single channel base stations.

A variety of antenna configurations can be used for the transceivers in the local interface of the base station (see FIG. 5). FIG. 8A shows an antenna system using a single antenna 810 for both receiving and transmitting the signals to wireless terminals. As shown in FIG. 8A, antenna 810 is coupled through a lightning arrestor 820 to bandpass filter 830. Bandpass filter 830 passes signals having approximately the desired frequency for the received and transmitted signal. During standby operation of base station 303 (see FIG. 3), a transmit/receive switch 840 (see FIG. 8A) is set to pass signals from antenna 810 and bandpass filter 830 to a receiver section 860 of the transceiver 860. The receiver section 860 decodes the signal and passes data to a control unit in base station 303 (see FIG. 3). The receiver section also measures the strength of the signal and provides the control unit with an indication of the signal strength. The control unit attempts to identify signals having a recognized format for a transmission from wireless terminal 305 and determine accordingly if base station 303 should respond to the signal. When a received signal is recognized and a response is required, the control unit sets switch 840 (see FIG. 8A) to a transmit mode which connects a transmitter section 850 of the transceiver to antenna 810. The control unit then causes transmitter section 850 to transmit an acknowledgment or other appropriate response to the signal received.

Figure 8B:
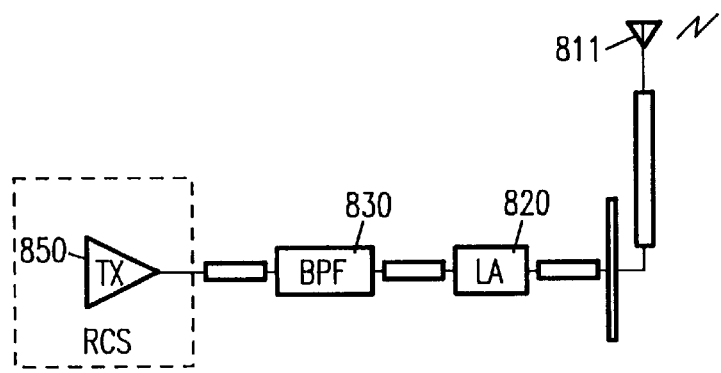
Figure 8C:
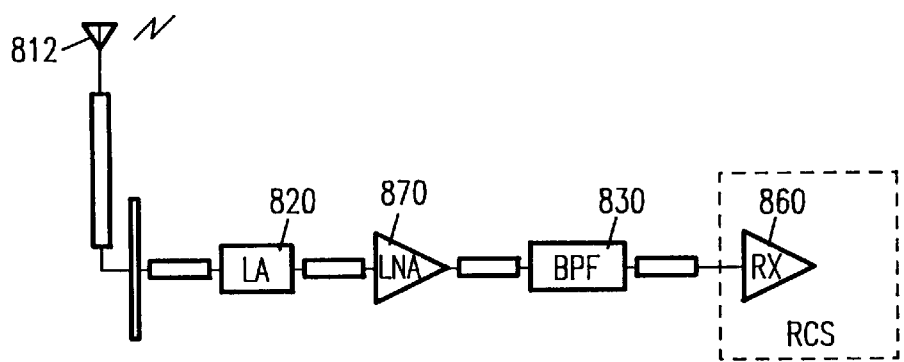

FIGS. 8B and 8C show, respectively, a transmitter transmitting section of base station 303, via antenna 811, and a receiver section of base station 303, via receiving antenna 812. As shown in FIG. 8A, in this embodiment, transmitter section 850 provides the output signal through a bandpass filter 830, a lightning arrestor 820, and transmitting antenna 811. Likewise, receiving antenna 812 passes the received signal through lightning arrestor 820 to be amplified at a linear amplifier 870. A band pass filter 830 filters the amplified output signal of linear amplifier 870. The filter signal is then decoded, in the manner similar to that described above in regard to FIG. 8A.

Figure 9:
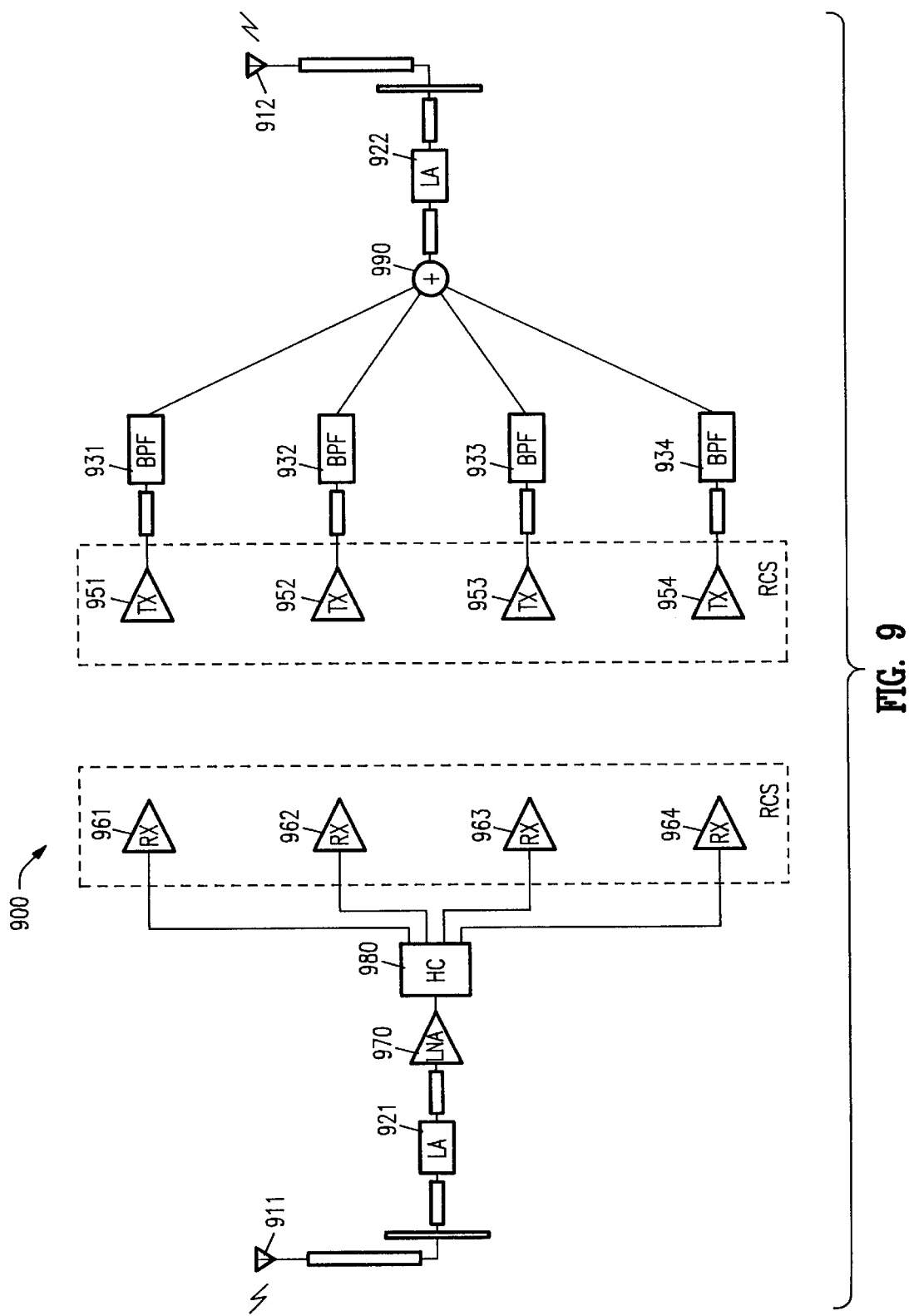
FIG. 9 is a block diagram of an antenna system for transceivers in a multi-channel base station.

FIG. 9 shows an antenna system 900 for a multi-channel base station 303 (see FIG. 3). Antenna system 900 (see FIG. 9) includes a receiving antenna 911 and a transmitting antenna 912. On the receiving side, a signal received at antenna 911 passes through a lightning arrestor 921 to be amplified at linear amplifier 970. A ferrite hybrid combiner 980 to provide the amplified received signal to receiver sections 961–964. Each of receiver sections 961–964 represents, in base station 303 (FIG. 3), a different transceiver which operates on a different frequency signal.

On the transmitting side, transmitter sections 951–954 (FIG. 9), each corresponding to one of receivers 961–964, each operate at a different frequency from the other transmitter sections. The signal to be transmitted at each of transmitter sections 951–954 is filtered by bandpass filters 931 to 954, and then summed with other signals from other signals from the other transmitter sections. The output signals of transmitter sections 951–954 are summed at summing junction 990, passes through lightning arrestor 922, to be transmitted at antenna 912.

Returning to FIG. 3, a high power backhaul radio link 307 connects base station 303 and network control center 309. In one embodiment of the invention, high power backhaul radio link 307 can be wireless link operating at a power of approximately 3 watts and has a range of approximately 10 km. Alternatively, link 307 between base station 303 and network control center 309 can also be a wired link.

As discussed above, a large number of wireless terminals, such as wireless terminal 305, and base stations, such as base station 303, can share the same operating frequency under a "frequency reuse" scheme. Frequency reuse has several advantages. For instance, sharing a single frequency among a large number of wireless terminals and base stations means that only a few channels need to be licensed from government entities. As a result, the cost of operating two-way wireless data network 300 is minimized and the electromagnetic spectrum is used more efficiently. However, a frequency reuse regime requires a radio channel access protocol to ensure (i) high channel utilization, (ii) guaranteed and fair access to a base station by any wireless terminal within the service area; and (iii) collision avoidance or recovery. There are many radio channel access protocols that can be used within the scope of the present invention. For instance, in one embodiment of the invention, the well-known ALOHA protocol is used. Under ALOHA, each user of the channel, e.g. wireless terminal 305 or base station 303, can transmit over the channel at any time. If an acknowledgement signal is not received from the recipient of the message within a certain pre-selected time interval, retransmission will be attempted. The present embodiment uses a modified ALOHA protocol, which is described in detail in the co-pending patent application entitled "Wireless Network Access Protocol," by Weijia Wang et al, attorney docket number M-3456-US, incorporated by reference above.

At network control center 309, the information from wireless terminal 305 is routed through interfaces 311–315 to information or communication applications, using such communication media as public package switching networks 317 or public telephone networks 319. These information or communication applications represent any number of useful applications for the present invention, including two-way paging systems (described in more detail above), on-demand stock quotation systems, point-of-sale credit card verification systems, on-demand information dissemination systems, or any other information systems using radio frequencies for data dissemination.

Two-way wireless data network 300 has several advantages over both one-way communication system 100 and two-way paging system 200. For instance, as described above, local radio link 301 between wireless terminal 305 and base station 303, and backhaul radio link 307 between base station 303 and switching center 309, are both two-way (symmetrical) radio links. Therefore, wireless terminal 305 can send and receive signals to and from base station 303 and base station 303 can send and receive signals from network control center 309. Consequently, two-way wireless data network 300, unlike prior art one-way communication system 100 (see FIG. 1), provides an immediate response or reply capability.

As one example of the advantage of having a real-time response capability, when one of the information or communication applications is a two-way wireless terminal or pager, the paged party does not need to locate a hard wired or cellular telephone before responding to the pager signal. An example of the application of two-way wireless data network 300 as a two-way paging system is discussed in more detail above.

In addition, because two-way wireless data network 300 provides two-way communication with the user interface, two-way wireless data network 300 can be used as an information dissemination network with an information on demand capability. For that application, the subscriber can use wireless terminal 305 to send a message requesting specific information, for instance stock or commodity quotation. Base station 303, upon receiving this message, relays the message to network control center 309, where the message is forwarded to an information provider via one of interfaces 311–315. The information provider can then return the requested information in a paging message to wireless terminal 305. Thus, the disadvantages of the prior art information dissemination methods, i.e. having to send information periodically, rather than on-demand, having to send to all subscribers the same information, or providing each subscriber more information that he or she cares for, are overcome.

In addition, since two-way wireless network data 300 includes base station 303, and symmetrical data links 301 and 307, two-way wireless data network 300 can be used for other applications such as monitoring utility meters. In this application, the utility company transmits to network control center 309 a message designating a usage meter equipped with a wireless terminal similar to wireless terminal 305 described above. Network control center 309 then sends the message via a transmitter similar to those used to send one-way paging signals. Upon receiving the message, the wireless terminal on the meter sends the requested reading in a message, which is picked up by a base station, such as base station 303. The base station then relays the message to network control center 309 to forward to the utility company. Thus, meter readings can be taken from remote regions without sending personnel to physically access meters.

Two-way wireless data network 300 can also be used in other applications, such as electronic map and vehicle positioning systems, remote points of sale systems, stock trading systems, remote wagering systems, fleet dispatch, i.e., taxi, bus, or courier services, vending machine monitoring for stock levels, or any other application in which information is to be retrieved on demand.

Further, capacity of two-way wireless data network 300 can be increased by increasing the number of base stations and network control centers, or to use additional frequencies.

Although the present invention has been described with reference to particular embodiments, the description is only an example of the invention's application and should not be taken as a limitation. In particular, even though much of preceding discussion was aimed at two alternative embodiments of this invention. Various other adaptations and combinations of features of the embodiments disclosed are within the scope of the present invention as defined by the following claims.

We claim:

1. A wireless data network serving a service area, comprising:
    a network control center;
    a plurality of cellular base stations, each serving a portion of said service area, each of said cellular base station communicating with said network control center;
    a plurality of mobile wireless terminals each capable of two-way communication with said cellular base stations over a first radio link, each of said mobile wireless terminals also capable of receiving a broadcast message over a second radio link; and
    a broadcast network, including a transmitter having a range greater than each of said portions of said service areas, for sending said broadcast message to said mobile wireless terminals over said second radio link.

2. A wireless data network as in claim 1, wherein each of said mobile wireless terminals is assigned a periodically occurring time slot during which the wireless terminal is activated to receive said broadcast message.

3. A wireless data network as in claim 1, wherein said first radio link uses a predetermined radio channel common to all of said mobile wireless terminals and said cellular base stations.

4. A wireless data network as in claim 1, wherein said first radio link is accessed using a multiple access protocol.

5. A wireless data network as in claim 1, wherein said first radio link is a secured communication link in which an acknowledgement packet is sent by a recipient in response to each message received, and a message is retransmitted if a sender does not received said acknowledgement packet after a predetermined time of sending said message.

6. In a wireless data network as defined in claim 1, a method comprising the steps of:
    sending over said first radio link, from a first one of said mobile wireless terminal, to a first one of said cellular base station, a data packet designated for a second one of said wireless terminal;
    upon receiving said data packet at said first cellular base station, sending said data packet from said first cellular base station to said network control center;
    sending a notification message from said network control center to said broadcast network, said notification message including an identification code of said second mobile wireless terminal;
    broadcasting, from said transmitter of said broadcast network, said notification message as said broadcast message designating said second mobile wireless terminal;
    receiving at said second mobile wireless terminal said notification message;
    upon receiving said broadcast message, sending a control message from said second mobile wireless terminal over said first radio link to a second cellular base station, said control message including a request to said network control center to forward said data packet;
    upon receiving said control message, sending said data packet from said network control center to said second cellular base station; and
    upon receiving said data packet at said second cellular base station, sending said data packet from said second cellular base station, over said first radio link, to said second mobile wireless terminal.

7. A method for providing a two-way wireless data network comprising:
    establishing a first communication link between a wireless terminal and a base station, said communication link being effective over a predetermined range;
    establishing a second communication link between said base station and a network control center, and
    establishing a third communication link between said network control center and said wireless terminal, said third communication link being effective over a range greater than said predetermined range wherein
    said first and second communication links are two-way communication links and said third communication link is a one-way communication link.

8. The method of claim 7, wherein said wireless terminal comprises a radio transceiver.

9. The method of claim 7, wherein said wireless terminal comprises a handheld terminal having a display and a keyboard.

10. The method of claim 9, wherein said wireless terminal comprises a two-way pager.

11. The method of claim 9, wherein said wireless terminal comprises a hand-held facsimile terminal.

12. The method of claim 7, wherein said base station comprises:
   a first radio transceiver; and
   a second radio transceiver.

13. The method of claim 7, wherein said first communication link is a low power local radio link.

14. The method of claim 7 wherein said second communication link is a high power backhaul radio link.

15. The method of claim 8, wherein said base station comprises:
   a two-way local interface adapted for interfacing with said first communication link for receiving and transmitting wireless signals within a local area, wherein said local area is contained within a service area;
   a backhaul interface adapted for interfacing with said second communication link between said base station and said network control center; and
   a control unit which controls said two-way local interface to communicate with said wireless terminal within said local area and relays information from said wireless terminal in said local area, to said network control center, via said backhaul interface.

16. The method of claim 15, wherein said second communication link comprises a telephone link between said base station and said network control center.

17. The method claim 15, wherein said second communication link comprises a wireless link between said base station and said network control center.

18. The method of claim 15, wherein said backhaul interface is adapted for communications with said network control center such that said network control center directs information to a transmission tower for transmitting said information over said third communication link.

19. The method of claim 15, wherein said two-way local interface further provides two-way communications between said base station and a second base station.

20. The method of claim 8, further comprising:
   interfacing said network control center with an information and communication application.

21. The method claim 20, wherein said information and communication application is an existing one-way communications network.

22. The method of claim 20, wherein said information and communication application is an information dissemination network.

23. The method of claim 20, wherein said information and communication application is a monitoring system.

24. The method of claim 20, wherein said information and communication application is an electronic map\positioning system.

25. A method for providing a two-way paging system over a service area, said method comprising the steps of:
   establishing a first communication link between a wireless terminal and a base station, said first communication link being effective over a first predetermined range;
   establishing a second communication link between said base station and a network control center; and
   establishing a third communication link between said network control center and a transmitter having a range greater than said predetermined range of said first communication link, wherein
   said first and second communication links are two-way communication links.

26. The method of claim 25, wherein said wireless terminal is a two-way pager.

27. The method of claim 25, wherein said base station comprises:
   a first radio transceiver; and
   a second radio transceiver.

28. The method of claim 25, wherein said first communication link is a low power local radio link.

29. The method of claim 28, wherein said second communication link is a high power backhaul radio link.

30. The method of claim 28, wherein said high power backhaul radio link operates at a power of approximately 3 watts.

31. The method of claim 28, wherein said high power backhaul radio link has a range of approximately 10 kilometers.

32. The method of claim 25, wherein said base station comprises:
   a two-way local interface adapted for interfacing with said first communication link for receiving and transmitting wireless signals within a local area, wherein said local area is contained within said service area;
   a backhaul interface adapted for interfacing with said second communication link between said base station and said network control center; and
   a control unit which controls said two-way local interface to communicate with said wireless terminal within said local area and relays information from said wireless terminal in said local area to said network control center via said backhaul interface.

33. The method of claim 32, wherein said second communication link comprises a telephone link between said base station and said network control center.

34. The method of claim 32, wherein said second communication link comprises a wireless link between said base station and said network control center.

35. The method of claim 32, wherein said backhaul interface is adapted for communications with said network control center such that said network control center directs information to said transmitter via said third communication link.

36. The method of claim 32, wherein said two-way local interface further provides two-way communication between said base station and a second base station.

37. The method of claim 33, wherein said third communication link comprises a wireless link between said network control center and said transmitter.

38. The method of claim 33, wherein said third communication link comprises a telephone link between said network control said and said transmitter.

39. A two-way wireless data network comprising:
   a wireless terminal;
   a base station;
   a first communication link between said wireless terminal and said base station, said first communication link being effective over a predetermined range;
   a network control center; and
   a second communication link between said base station and said network control center, and
   a third communication between said network control center and a radio frequency transmitter having a range greater than said predetermined range wherein said first and second communication links are two-way communication links.

40. The two-way wireless data network of claim 39, wherein said wireless terminal comprises a radio transceiver.

41. The two-way wireless data network of claim 39, wherein said wireless terminal comprises a handheld terminal having a keyboard and a display.

42. The two-way wireless data network of claim 41, wherein said wireless terminal comprises a two-way pager.

43. The two-way wireless data network of claim 41, wherein said wireless terminal comprises a hand-held facsimile terminal.

44. The two-way wireless data network of claim 39, wherein said base station further comprises:
   a first radio transceiver; and
   a second radio transceiver.

45. The two-way wireless data network of claim 39, wherein said first communication link is a low power local radio link.

46. The two-way wireless data network of claim 39, wherein said second communication link is a high power backhaul radio link.

47. The two-way wireless data network of claim 39, wherein said high power backhaul radio link operates at a power of approximately 3 watts.

48. The two-way wireless data network of claim 39, wherein said high power backhaul radio link has a range of approximately ten kilometers.

49. The two-way wireless data network of claim 39, wherein said base station further comprises:
   a two-way local interface adapted for interfacing with said first communication link for receiving and transmitting wireless signals within a local area, wherein said local area is contained within said service area;
   a backhaul interface adapted for interfacing with said second communication link between said base station and said network control center; and
   a control unit which controls said two-way local interface to communicate with said wireless terminal within said local area and relays information from said wireless terminal in said local area, to said network control center, via said backhaul interface.

50. The two-way wireless data network of claim 49, wherein said second communication link comprises a telephone link between said base station and said network control center.

51. The two-way wireless data network of claim 49, wherein said second communication link comprises a wireless link between said base station and said network control center.

52. The two-way wireless data network of claim 49, wherein said backhaul interface is adapted for communications with said network control center such that said network control center directs information to said transmitter.

53. The two-way wireless data network of claim 49, wherein said two-way local interface further provides two-way communications between said base station and a second base station.

54. The two-way wireless data network of claim 39, further comprising:
   a interface, wherein said interface interfaces said network control center with an information and communication application.

55. The two-way wireless data network of claim 54, wherein said information and communication application is an existing one-way communications network.

56. The two-way wireless data network of claim 54, wherein said information and communication application is an information dissemination network.

57. The two-way wireless data network of claim 54, wherein said information and communication application is a monitoring system.

58. The two-way wireless data network of claim 54, wherein said information and communication application is an electronic map/positioning system.

59. A two-way paging system over a service area, comprising:
   a wireless terminal;
   a base station;
   a first communication link between said wireless terminal and said base station, said first communication link being effective over a first range;
   a network control center;
   a second communication link between said base station and said network control center;
   a transmitter having a range greater than said first range; and
   a third communication link between said network control center and said said transmitter, wherein said first and second communication links are two-way communication links.

60. The two-way paging system of claim 59, wherein said wireless terminal comprises a two-way pager.

61. The two-way paging system of claim 59, wherein said base station further comprises:
   a first radio transceiver; and
   a second radio transceiver.

62. The two-way paging system of claim 59, wherein said first communication link is a low power local radio link.

63. The two-way paging system of claim 62, wherein said second communication link is a high power backhaul radio link.

64. The two-way paging system of claim 59, wherein said base station further comprises:
   a two-way local interface adapted for interfacing with said first communication link for receiving and transmitting wireless signals within a local area, wherein said local area is contained within said service area;
   a backhaul interface adapted for interfacing with said second communication link between said base station and said network control center; and
   a control unit which controls said two-way local interface to communicate with said wireless terminal within said local area and relays information from said wireless terminal in said local area, to said network control center, via said backhaul interface.

65. The two-way paging system of claim 64, wherein said second communication link comprises a telephone link between said base station and said network control center.

66. The two-way paging system of claim 64, wherein said second communication link comprises a wireless link between said base station and said network control center.

67. The two-way paging system of claim 64, wherein said backhaul interface is adapted for communications with said network control center such that said network control center directs information to said transmitter.

68. The two-way paging system of claim 64, wherein said two-way local interface further provides two-way communications between said base station and a second base station.

* * * * *